(12) United States Patent
Imagawa

(10) Patent No.: US 7,933,175 B2
(45) Date of Patent: Apr. 26, 2011

(54) OPTICAL DISK DRIVE

(75) Inventor: Seiji Imagawa, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 571 days.

(21) Appl. No.: 11/488,616

(22) Filed: Jul. 19, 2006

(65) Prior Publication Data

US 2007/0177469 A1 Aug. 2, 2007

(30) Foreign Application Priority Data

Sep. 15, 2005 (JP) .................................. 2005-267860

(51) Int. Cl.
G11B 7/00 (2006.01)
(52) U.S. Cl. .................... 369/44.23; 369/44.29; 369/94; 369/112.24
(58) Field of Classification Search ............... 369/44.23, 369/112.01, 44.27–44.29, 94
See application file for complete search history.

(56) References Cited

U.S. PATENT DOCUMENTS

| | | | | |
|---|---|---|---|---|
| 4,731,771 A | * | 3/1988 | Maeda et al. | ............... 369/44.25 |
| 5,903,531 A | * | 5/1999 | Satoh et al. | ................ 369/44.29 |
| 2001/0055257 A1 | | 12/2001 | Sato et al. | |
| 2002/0027842 A1 | | 3/2002 | Komma et al. | |
| 2002/0041542 A1 | * | 4/2002 | Sano et al. | ................. 369/44.23 |
| 2003/0202437 A1 | * | 10/2003 | Yamada et al. | ............ 369/44.29 |
| 2004/0218484 A1 | * | 11/2004 | Kuze et al. | ................. 369/44.23 |
| 2005/0237873 A1 | * | 10/2005 | Maruyama et al. | ........ 369/44.23 |
| 2008/0285408 A1 | | 11/2008 | Fujiune et al. | |

FOREIGN PATENT DOCUMENTS

| | | |
|---|---|---|
| JP | 2001-266392 | 9/2001 |
| JP | 2002-157750 | 5/2002 |
| JP | 2002-304750 | 10/2002 |
| JP | 2002-334476 | 11/2002 |
| JP | 2003-016660 | 1/2003 |

* cited by examiner

*Primary Examiner* — Joseph Haley
*Assistant Examiner* — Nicholas Lee
(74) *Attorney, Agent, or Firm* — Antonelli, Terry, Stout & Kraus, LLP.

(57) ABSTRACT

In an optical disc drive that needs an aberration correcting element for correcting spherical aberrations, it takes long time to conduct a processing operation of the aberration correcting element in an interlayer movement of a multilayer disc and a drive initializing operation. In order to eliminate the problem, an optical disc drive using a pickup includes a focus actuator for moving an objective lens in a rotation axis direction of a disc, a tracking actuator for moving the objective lens in a radial direction of the disc, an aberration corrector for correcting aberrations, and a feeder for moving the pickup in the disc radial direction. A control operation of the aberration corrector and a control operation of the feeder are conducted in parallel.

10 Claims, 10 Drawing Sheets

OPTICAL DISK DRIVE

INCORPORATION BY REFERENCE

The present application claims priority from Japanese application JP2005-267860 filed on Sep. 15, 2005, the content of which is hereby incorporated by reference into this application.

BACKGROUND OF THE INVENTION

The present invention relates to an optical disc drive, and in particular to an operational configuration including an aberration correcting element.

Conventional techniques will now be described. In JP-A-2003-016660, an operation is conducted to bring an aberration correcting element into an optimum state in its movement destination layer before focus jump operation for moving an optical spot to another layer. In JP-A-2002-157750, a focus jump operation for moving an optical spot to another layer and an operation for bringing a spherical aberration correcting element into an optimum state in its movement destination layer are started nearly at the same time.

SUMMARY OF THE INVENTION

The method of bringing the spherical aberration correcting element into an optimum state in the movement destination layer before the focus jump for moving the optical spot to another layer as described above is a method which is effective to secure the stability of focus control in the movement destination layer. However, this results in a problem that the access operation time including the interlayer movement increases as compared with conventional DVDs which do not need control of the spherical aberration correcting element.

In the method of starting the focus jump and the spherical aberration correction nearly at the same time and bringing the spherical aberration correcting element into the optimum state in the movement destination layer before the optical spot arrives at another layer, it is possible to shorten the operation time of the interlayer movement operation including the spherical aberration correcting element control. Since the focus jump operation is one several hundredths as short as the processing time of the spherical aberration correcting element, however, the effect of time shortening brought about by the simultaneous processing is slight.

Therefore, an object of the present invention is to solve the above-described problem and provide an optical disc drive capable of shortening the operation time of the access operation or the drive preparation operation.

In order to solve the problem, the present invention provides an optical disc drive using a pickup and including a focus actuator for moving an objective lens in a rotation axis direction of a disc, a tracking actuator for moving the objective lens in a radial direction of the disc, an aberration corrector for correcting aberrations, and a feeder for moving the pickup in the disc radial direction, wherein a control operation of the aberration corrector and a control operation of the feeder are conducted in parallel.

According to the present invention, it is possible to shorten the operation time of the optical disc drive and improve the user's operability.

Other objects, features and advantages of the invention will become apparent from the following description of the embodiments of the invention taken in conjunction with the accompanying drawings.

DESCRIPTION OF THE EMBODIMENTS

Hereafter, embodiments of the present invention will be described.

First Embodiment

First, a configuration of an optical disc drive according to the present invention will now be described.

Figure 1:
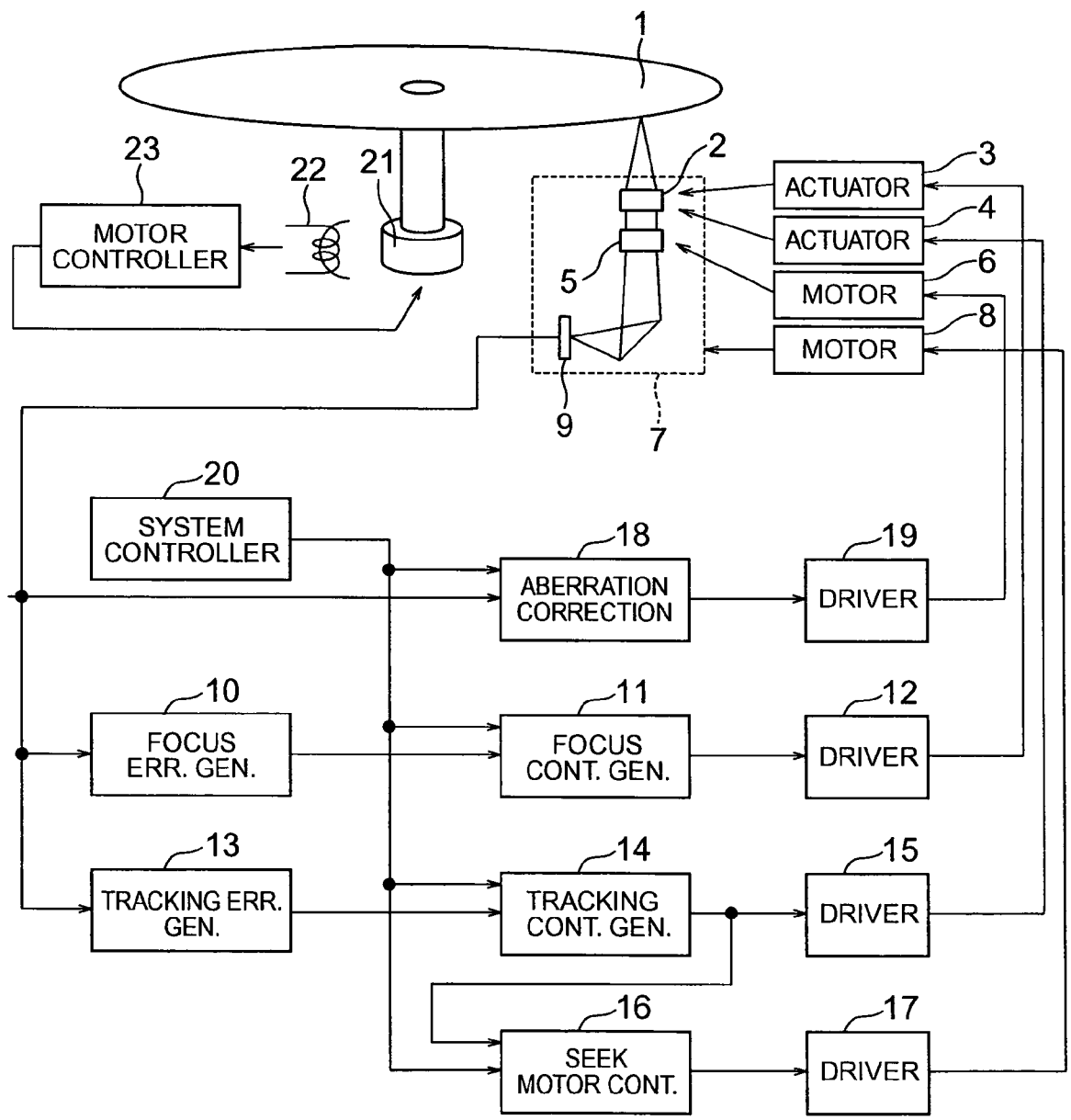
FIG. 1 is a diagram showing components in a first embodiment of the present invention.

In FIG. 1, reference numeral 1 denotes a disc, 2 an objective lens, 3 a focus actuator for driving the objective lens in a rotation axis direction of the disc, 4 a tracking actuator for driving the objective lens in a radial direction of the disc, 5 a lens for correcting spherical aberrations, 6 a spherical aberration correcting motor for driving the spherical aberration correcting lens in an optical axis direction, 7 an optical pickup unit including the objective lens and the spherical aberration correcting lens, 8 a seek motor for driving the optical pickup unit in the radial direction of the disc, 9 a detector, 10 a focus error signal generator for generating a signal of an error between the disc and the objective lens in a focus direction, 11 a focus control signal generator for controlling the focus actuator so as to position an optical spot on a disc recording face or reproducing face, 12 a focus actuator driver for driving the focus actuator, 13 a tracking error signal generator for generating a signal of an error between a track of the disc and the objective lens in a tracking direction, 14 a tracking control signal generator for controlling the tracking actuator so as to position the optical spot on a predetermined track of the disc, 15 a tracking actuator driver for driving the tracking actuator, 16 a seek motor controller for controlling the seek motor, 17 a seek motor driver for driving the seek motor, 18 a spherical aberration correcting lens controller for controlling a position of the spherical aberration correcting lens, 19 a spherical aberration correcting lens driver for driving the spherical aberration correcting lens, 20 a system controller for managing a state and an operation of the drive and issuing an operation order suitable for the state and operation of the drive to the controller, 21 a spindle motor for rotating the disc, 22 a frequency generator for generating a signal based on a rotational speed of the spindle motor, and 23 a motor controller for exercising control so as to cause the spindle motor to rotate at a predetermined speed.

Operation outlines of the blocks and relations between blocks will now be described.

In FIG. 1, the focus actuator 3 moves the objective lens 2 in the rotation axis direction of the disc, and the tracking actuator 4 moves the objective lens 2 in the radial direction of the disc. Furthermore, the seek motor 8 moves the optical pickup unit 7 in the radial direction of the disc, and the spherical aberration correcting motor 6 moves the spherical aberration correcting lens 5 in the optical axis direction. The detector 9 converts reflected light to an electric signal, and sends a resultant signal to the focus error signal generator 10, the tracking error signal detector 13, and the spherical aberration correcting lens controller 18.

The focus error signal generator 10 generates a focus error signal on the basis of the signal sent thereto, and sends the generated signal to the focus control signal generator 11. The focus control signal generator 11 generates a focus control signal on the basis of the signal sent from the focus error signal generator 10 and a signal sent from the system controller 20, and sends the generated signal to the focus actuator driver 12.

The focus actuator driver 12 drives the focus actuator 3 on the basis of the signal sent thereto. The tracking error signal generator 13 generates a tracking error signal on the basis of the signal sent thereto, and sends the generated signal to the tracking control signal generator 14. The tracking control signal generator 14 generates a tracking control signal on the basis of the signals sent from the tracking error signal generator 13 and the system controller 20, and sends the generated signal to the tracking actuator driver 15 and the seek motor controller 16. The tracking actuator driver 15 drives the tracking actuator 4 on the basis of the signal sent thereto.

The seek motor controller 16 generates a seek motor control signal on the basis of the signals sent from the system controller 20 and the tracking control signal generator 14, and sends the generated signal to the seek motor driver 17. The seek motor driver 17 drives the seek motor 8 on the basis of the signal sent thereto. The spherical aberration correcting lens controller 18 generates a spherical aberration correcting motor control signal on the basis of the signals sent from the system controller 20 and the detector 9, and sends the generated signal to the spherical aberration correcting lens driver 19. The spherical aberration correcting lens driver 19 drives the spherical aberration correcting motor 6 on the basis of the signal sent thereto. The spindle motor 21 drives the disc 1.

The frequency generator 22 converts rotational speed information of the spindle motor 21 to an electric signal, and sends the resultant signal to the motor controller 23. The motor controller 23 controls the spindle motor 21.

A seek operation will now be described.

Figure 2:
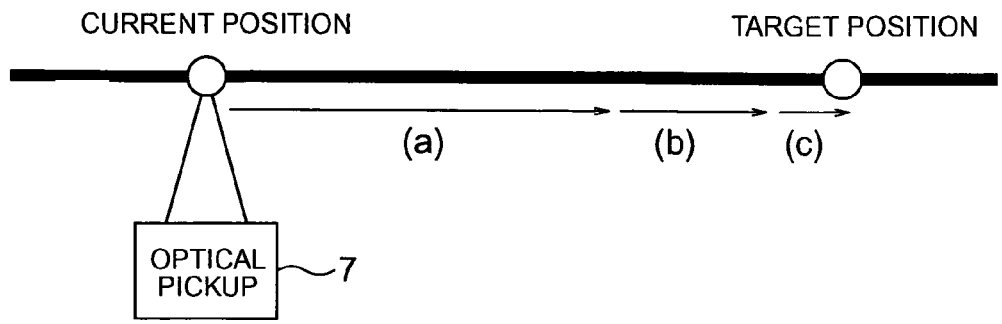
FIG. 2 is a diagram showing a seek operation in the same layer.

First, a seek operation which does not include an operation of the spherical aberration correcting element conducted conventionally in DVDs or CDs will now be described. By the way, a disc having a plurality of reproducing faces, a plurality of recording faces, or both a reproducing face and a recording face is referred to as multilayer disc. A disc having either one reproducing face or one recording face is referred to as single layer disc. In a seek operation in the same layer, (a) a coarse seek operation (a), a fine seek operation (b) or track jump (c) is conducted according to a difference in the number of tracks between a current position and a target position as shown in FIG. 2. Here, the coarse seek operation (a) means an operation of moving the seek motor roughly to the target position in a state in which the focus control is on and the tracking control is off. The fine seek operation (b) means an operation of moving the seek motor while counting the track movement quantity by using the tracking error signal and controlling the track moving speed by using the tracking error signal in the state in which the focus control is on and the tracking control is off.

Figure 3:
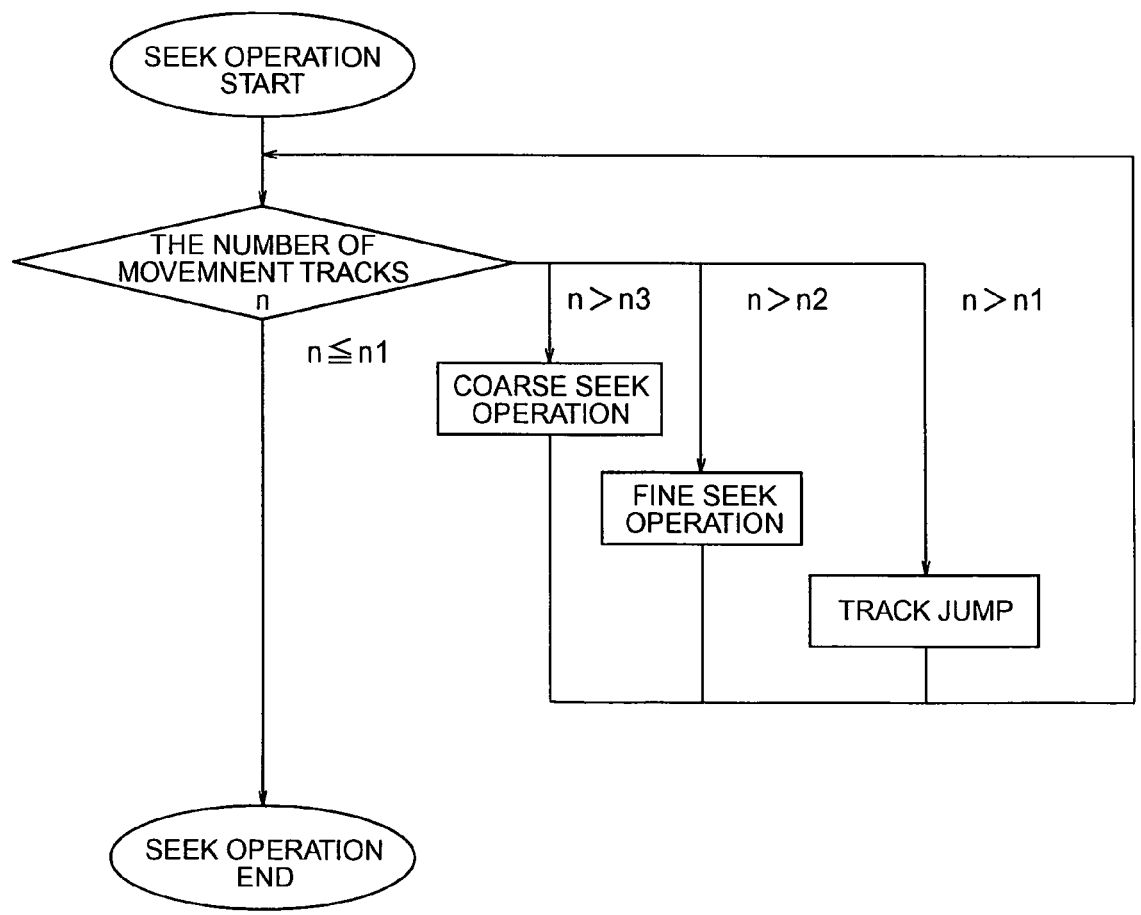
FIG. 3 is a flow-chart of a seek operation in the same layer.

The track jump (c) means an operation of moving the seek motor onto an adjacent track or onto the inner or outer circumference by several tracks by applying acceleration pulses or deceleration pulses to the tracking actuator. If the number of movement tracks is greater than a predetermined value n3, the coarse seek operation is conducted as shown in FIG. 3. If the number of movement tracks is greater than a predetermined value n2, the fine seek operation is conducted. If the number of movement tracks is greater than a predetermined value n1, the track jump is conducted. If the number of movement tracks is less than a predetermined value n1, the seek operation is finished. Here, the relation n3>n2>n1 is satisfied.

Figure 4A:
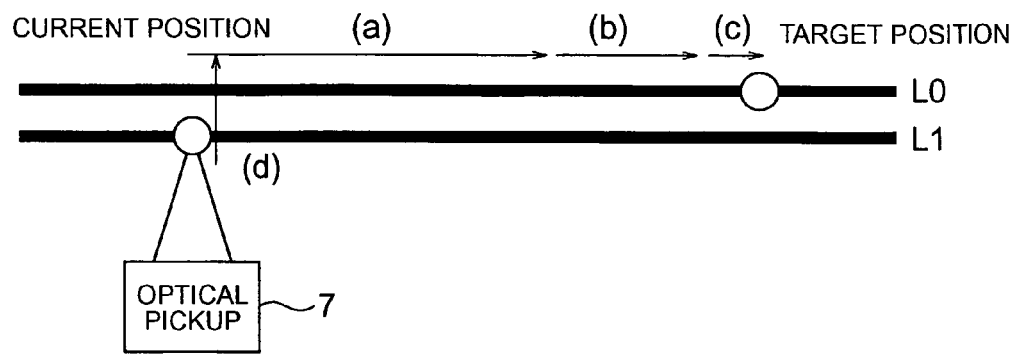
FIGS. 4A and 4B are diagrams showing an interlayer moving seek operation.
Figure 4B:
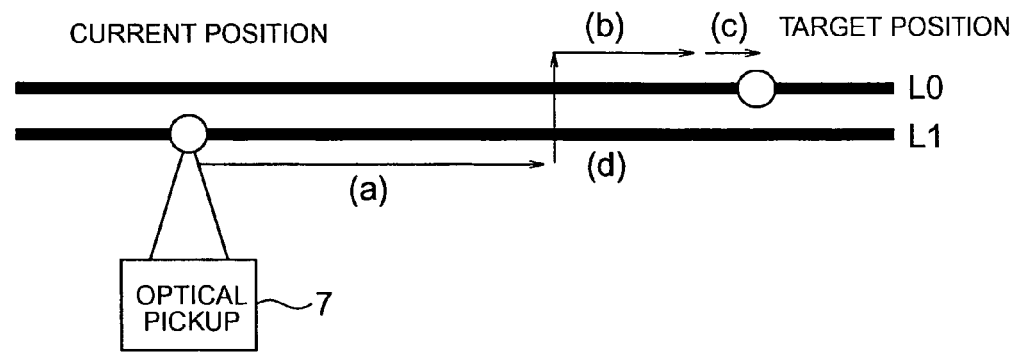

In a seek operation involving an interlayer movement, it is judged that the target position is not in the same layer, focus jump (d) is conducted, and then the coarse seek operation (a), the fine seek operation (b) and the track jump (c) are conducted, as shown in FIG. 4A. Or the coarse seek operation (a) is first conducted in the current layer, then focus jump is conducted to move to the layer of the target position, and then the fine seek operation (b) and the track jump (c) are conducted according to the number of tracks existing as far as the target, as shown in FIG. 4B.

Here, the focus jump (d) means an operation of moving the just focal point position of the optical spot from a predetermined layer to another layer by applying acceleration pulses and deceleration pulses to the focus actuator. In the latter-cited method shown in FIG. 4B in which the coarse seek operation is first conducted, the landing precision of the coarse seek operation is degraded by noncoincidence in disc eccentricity between the current layer and the target layer. Therefore, the former-cited method shown in FIG. 4A is higher in operation efficiency. If the current position is on an outer circumference of the disc and the target position is on an inner circumference of the disc, however, reliability of the focus jump operation can be ensured in the latter-cited method of conducting focus jump on an inner circumference of the disc as compared with the former-cited method of conducting focus jump on an outer circumference of the disc on which deflection of the disc face is large.

A seek operation including an operation of the spherical aberration correcting element according to the present invention will now be described by taking the spherical aberration correcting lens as an embodiment of the spherical aberration correcting element. Since the position of the spherical aberration correcting lens depends mainly on a disc substrate thickness between the disc surface and the data layer, the suitable position differs from layer to layer. Since the operation of the spherical aberration correcting element is not involved in the seek operation in the same layer, the seek operation is conducted according to the same procedure as that of the conventional technique described above.

On the other hand, in a seek operation an involving an interlayer movement in a multilayer disc, an operation of the spherical aberration correcting element is added to the above-described conventional procedure. Originally, it is desirable that the operation of the spherical aberration correcting lens coincides with the focus jump operation, a movement of the spherical aberration correcting lens starts in synchronism with jump start, and the position of the spherical aberration correcting lens also moves to a position optimum to the target layer at the time of servo pull-in in the target layer. Since the operation time of the spherical aberration correcting element is typically approximately one hundred ms and it is longer than the operation time of the focus jump which is several hundreds µs by at least two digits, however, the operation of the spherical aberration correcting lens cannot be actually made to coincide with the focus jump operation.

If in a state with the spherical aberration correcting lens focused to one layer the optical spot is focused to the other layer, then there is a fear that the signal level of the focus or tracking error signal might fall and the control might become unstable. The fall in the control stability exerts a greater influence at the time of open loop control such as servo pull-in at the time of focus jump than when feedback control is being conducted.

Figure 5A:
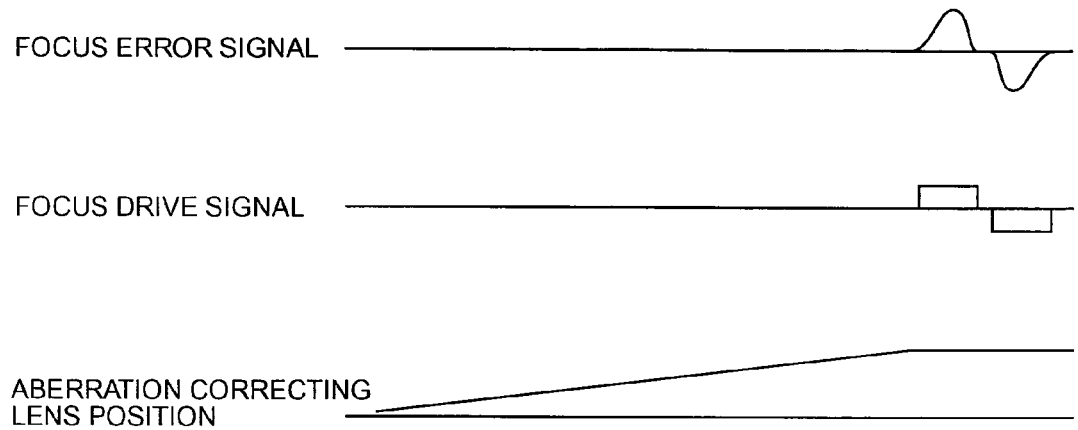
FIGS. 5A and 5B are diagrams showing operations of focus jump and an aberration correcting lens.
Figure 5B:
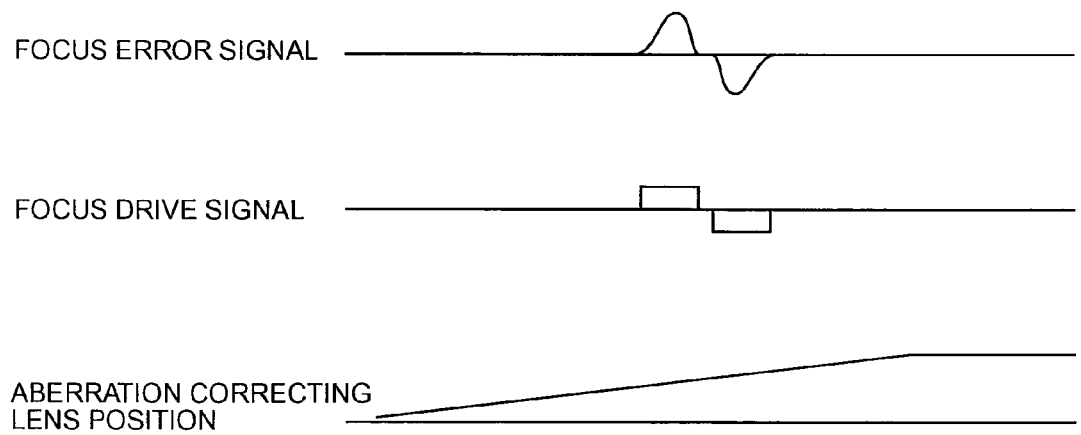

Therefore, it becomes necessary for the spherical aberration correcting lens to have reached at least the target layer side as compared with a middle point between the current layer and the target layer at the time of the servo pull-in in the focus jump as shown in FIGS. 5A and 5B.

On the other hand, the total time of the seek processing including the coarse seek operation (a), the fine seek operation (b) and the track jump (c) is in the range of approximately 100 to 200 ms. Since the operation time of the spherical aberration correcting lens which is equal to approximately 100 ms is added to this, the total of the seek processing time increases to approximately 1.5 times to twice. In the present invention, therefore, the coarse seek operation (a) and the spherical aberration correcting lens movement (e) are conducted in parallel to shorten the seek processing time.

Figure 6:
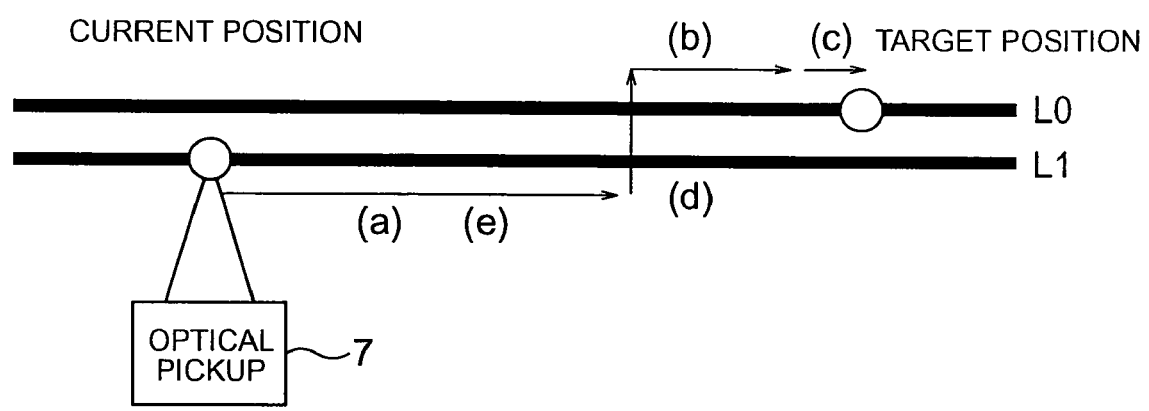
FIG. 6 is a diagram showing an operation in a first embodiment.
Figure 7:
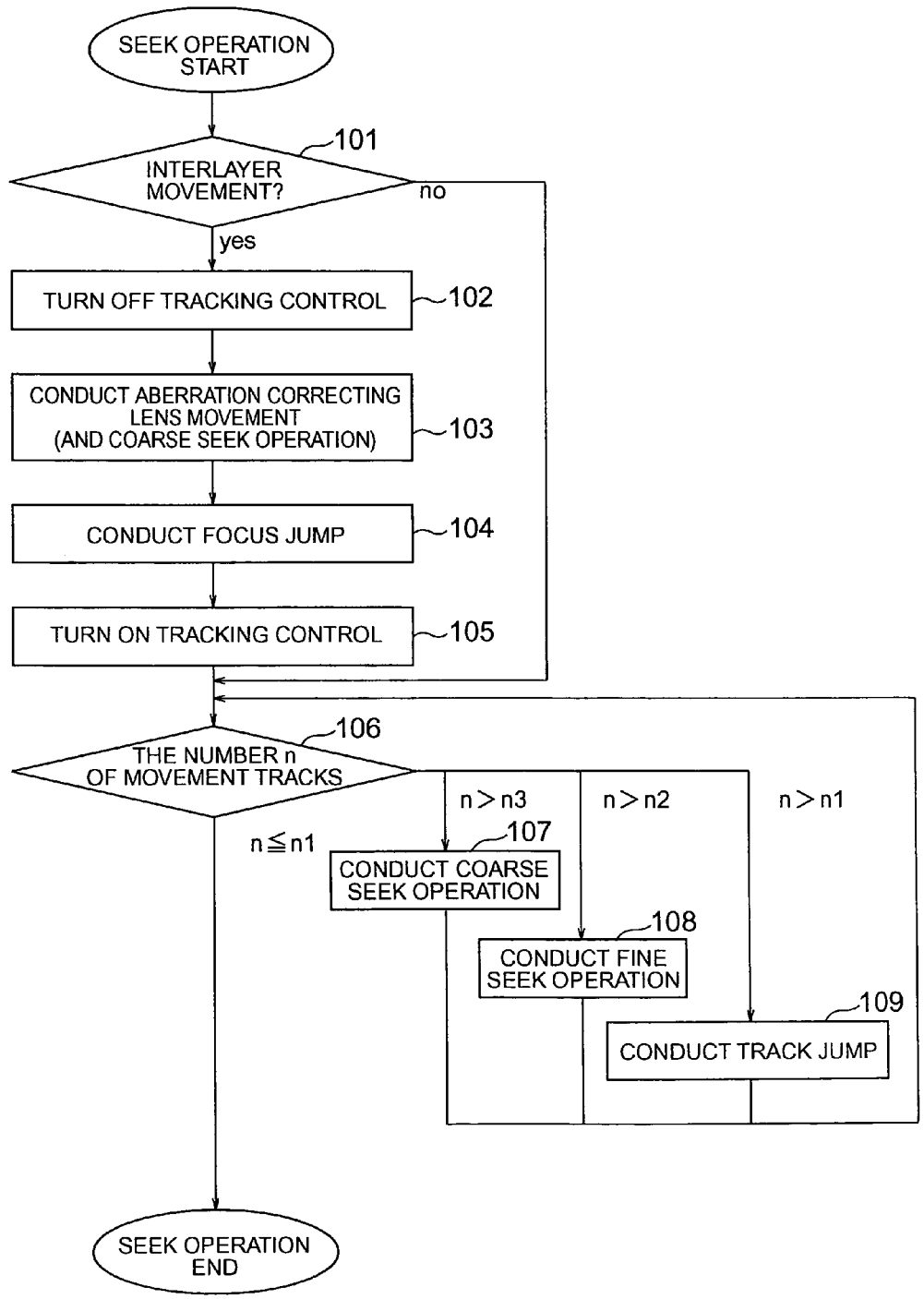
FIG. 7 is an operation flow chart of a first embodiment.

FIG. 7 shows the operation of FIG. 6 in a flow chart form. It is determined whether the target position is present in a layer different from that of the current position (101). If the target position is present in the same layer as that of the current position, then the coarse seek operation (107), the fine seek operation (108) and the track jump (109) are conducted according to the number of movement tracks (106) as in the conventional technique to conduct the movement to the target position. If the target position is present in a layer different from that of the current position, the tracking control is first turned off (102). Subsequently, the aberration correcting lens is moved to a suitable position in a layer of movement destination. In addition, a movement to a target radial position is conducted by the coarse seek operation, if necessary (103).

Subsequently, the focus jump is conducted, the optical spot is moved to the target layer (104). Subsequently, the tracking control is turned on and the current position is acquired (105). Finally, if necessary, the coarse seek operation (a) (107), the fine seek operation (b) (108) and the track jump (c) (109) are conducted according to the number of tracks existing as far as the target. If the target position is present in a layer different from that of the current position and the coarse seek operation is not necessary, then the parallel processing of the aberration correcting lens movement and the coarse seek operation is not conducted, but processing for only the movement of the aberration correcting lens is conducted.

These operations will now be described with reference to FIG. 1. The system controller 20 determines whether the seek operation involves the interlayer movement and whether the seek operation involves the coarse seek operation, on the basis of the current position and the seek target position.

If the interlayer movement is unnecessary, the system controller 20 calculates the number of movement tracks required to reach the target position, and controls the tracking control signal generator 14 and the seek motor controller 16 to conduct the coarse seek operation, the fine seek operation and the track jump according to the calculated number of tracks.

When conducting the coarse seek operation, a signal is first sent to the tracking control signal generator 14 so as to turn off the tracking control, then a drive distance of the seek motor is calculated on the basis of the current position and the seek target position, and a signal representing the calculated drive distance and a coarse seek start signal are sent to the seek motor controller 16. Finally, a-signal is sent to the tracking control signal generator 14 so as to turn on the tracking control.

When conducting the fine seek operation, a signal is first sent to the tracking control signal generator 14 so as to turn off the tracking control, then the number of tracks to be crossed is calculated on the basis of the current position and the seek target position, a signal representing the calculated number of tracks to be crossed is sent to the tracking control signal generator 14, and a fine seek start signal is sent to the tracking control signal generator 14 and the seek motor controller 16. The tracking control signal generator 14 controls the moving speed of the objective lens so as to cause a track crossing signal to have a predetermined period. The seek motor controller 16 controls the seek motor so as to follow the movement of the objective lens.

When conducting the track jump, the required number of movement tracks is calculated on the basis of the current position and the seek target position, and a signal representing the calculated number of movement tracks and a track jump start signal are sent to the tracking control signal generator 14. The tracking control signal generator 14 controls exercises track jump control according to the sent signal representing the number of movement tracks.

In the case of the seek operation involving the interlayer movement and the coarse seek operation, the system controller 20 controls the tracking control signal generator 14 and the seek motor controller 16 to conduct a movement to a radial position of the disc that is nearly the same as the target position in the same way as the coarse seek operation described above. At this time, the system controller 20 sends a movement position signal and a movement start signal of the aberration correcting lens to the spherical aberration correcting lens controller 18 so as to cause an operation of the spherical aberration correcting motor 6 in parallel to an operation of the seek motor, and the spherical aberration correcting lens controller 18 generates a control signal on the basis of the signals sent thereto. After the coarse seek operation and the spherical aberration lens movement have been finished, the system controller 20 sends a target layer signal which represents the movement destination of the focus jump, and a focus jump start signal to the focus control signal generator 11. The focus control signal generator 11 generates a focus jump control signal on the basis of the signals sent thereto.

After the focus jump is finished, the system controller 20 sends a signal to the tracking control signal generator 14 to turn on the tracking control. Thereafter, an operation similar to that in the case where the interlayer movement is not necessary is conducted, and a movement to the target position is conducted.

In the case of a seek operation involving the interlayer movement which does not need the coarse seek operation, the system controller 20 first sends a signal to the tracking control signal generator 14 to turn off the tracking control. Then, the system controller 20 sends a movement position signal and a movement start signal of the aberration correcting lens to the spherical aberration correcting lens controller 18.

The spherical aberration correcting lens controller 18 generates a control signal on the basis of the signals sent thereto. After the spherical aberration lens movement has finished, the system controller 20 sends a target layer signal which represents the movement destination of the focus jump, and a focus jump start signal to the focus control signal generator 11. The focus control signal generator 11 generates a focus jump control signal on the basis of the signals sent thereto. After the focus jump has finished, the system controller 20 sends a signal to the tracking control signal generator 14 to turn on the tracking control. Thereafter, an operation similar to that in the case where the interlayer movement is unnecessary is conducted, and a movement to the target position is conducted.

Figure 8:
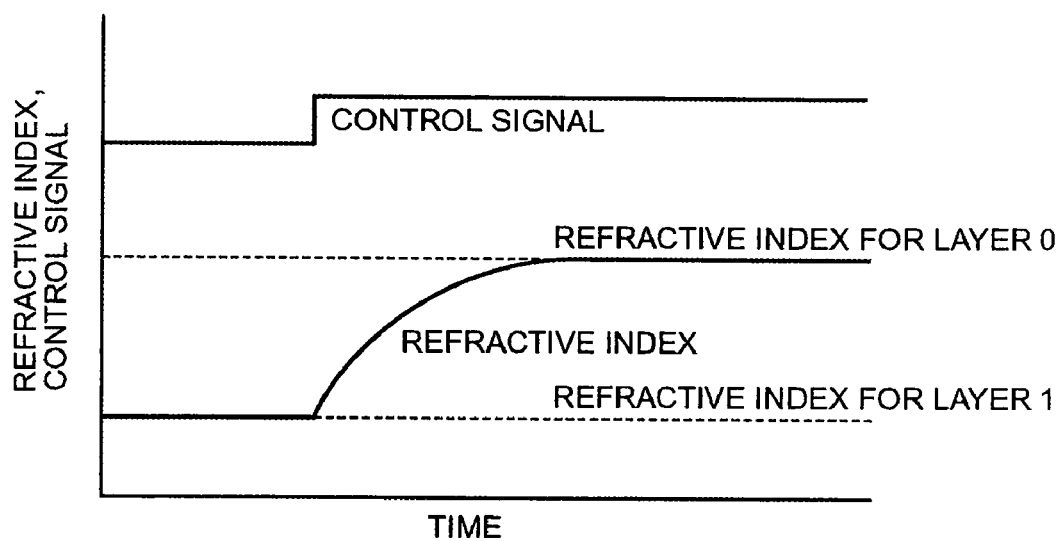
FIG. 8 is a diagram showing an operation of a liquid crystal spherical aberration correcting element.
Figure 9A:
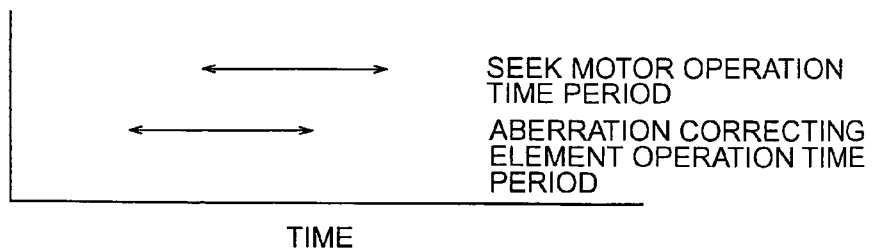
FIGS. 9A to 9D are diagrams showing a parallel operation of a seek motor and a spherical aberration correcting element.
Figure 9B:
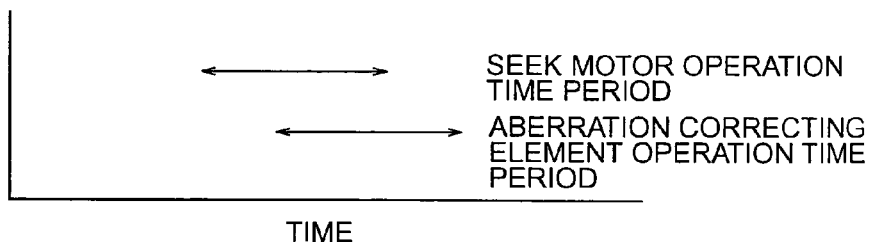
Figure 9C:
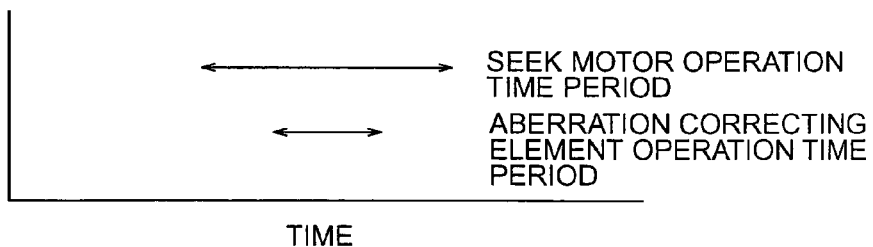
Figure 9D:
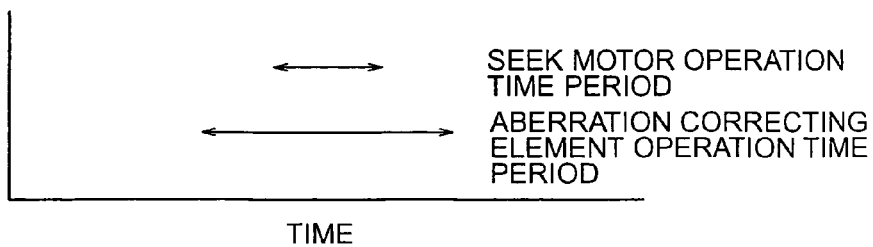

In the present embodiment, the spherical aberration correcting lens is used as the spherical aberration correcting element. However, the present invention is not restricted to this. In other words, even in the case where the spherical aberration correction is conducted by using a liquid crystal element, the refractive index transition time of the actual liquid crystal element is in the range of approximately one hundred ms to 1 second with respect to a control signal for conducting the spherical aberration correction into a different layer at the time of interlayer movement as shown in FIG. 8. Therefore, a similar effect is obtained by making the transition time parallel to the operation of the seek motor.

Furthermore, in the present embodiment, the position of the aberration correcting lens is made constant every layer as the spherical aberration correcting method. However, the present invention is not restricted to this. In other words, even in the case where the spherical aberration error signal is detected as occasion demands and the spherical aberrations are corrected in real time by using feedback control, processing time for conducting the spherical aberration correction into a different layer at the time of the interlayer movement is nearly equal to the operation time of the seek motor. Therefore, an equivalent effect is obtained by conducting the operation for conducting spherical aberration correction into the different layer and the operation of the seek motor in parallel.

Furthermore, in the present embodiment, the operation of the seek motor and the operation of the aberration correcting element are started substantially at the same time. However, the present invention is not restricted to this. In other words, if the operation time period of the seek motor is parallel to the operation time period of the aberration correcting element at least partially as shown in FIGS. 9A to 9D, an effect corresponding to the parallel time period is obtained.

Operability of the user can be improved by making the operation of the seek motor and the operation of the aberration correcting element parallel and shortening the movement time in the interlayer movement.

Second Embodiment

A configuration of an optical disc drive according to the present invention will now be described with reference to FIG. 10.

Figure 10:
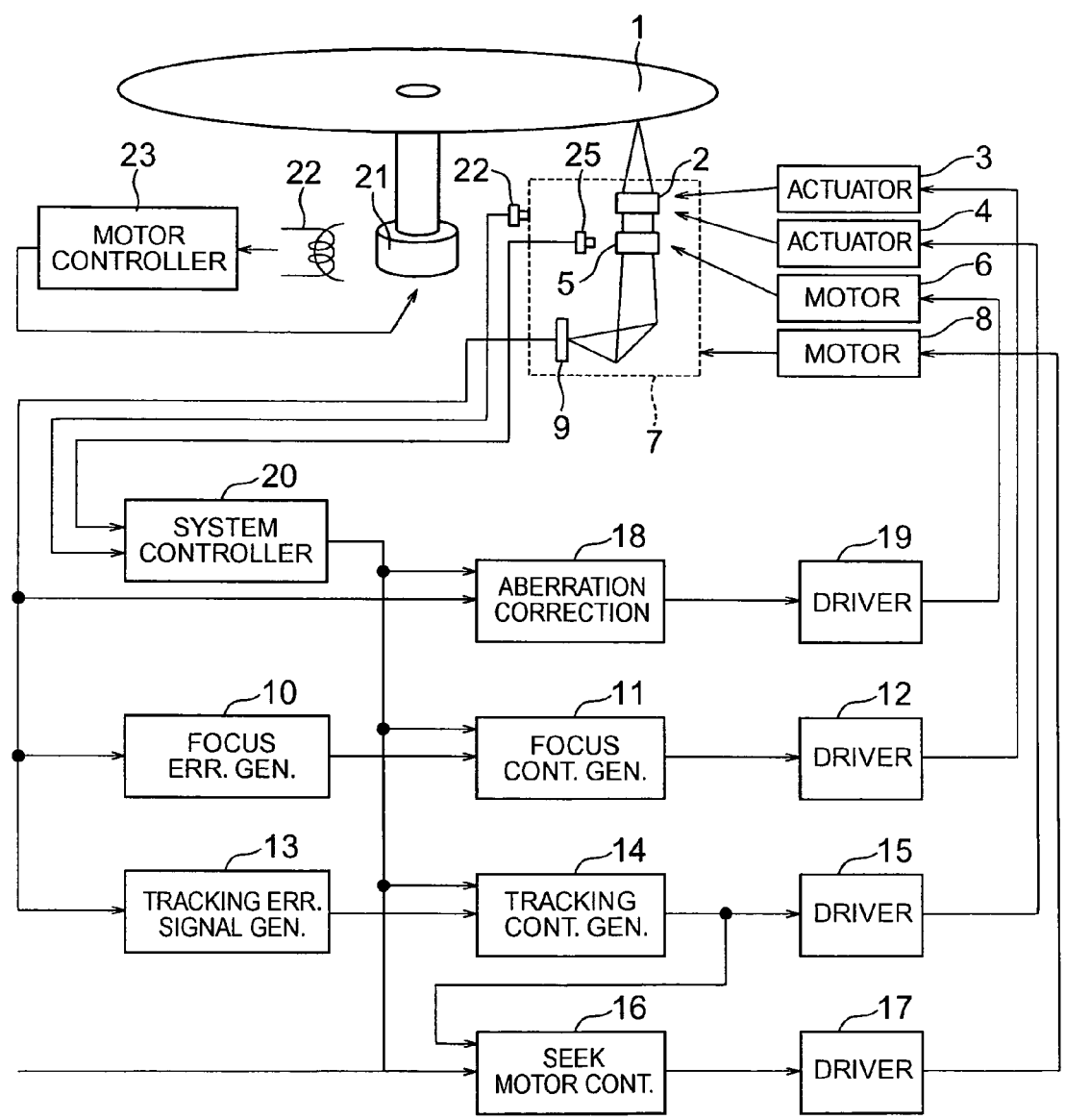
FIG. 10 is a diagram showing components in a second embodiment of the present invention.

Since blocks 1 to 23 in FIG. 10 are the same as those in the first embodiment, description of them will be omitted. In FIG. 10, reference numeral 24 denotes a seek motor movable end switch for detecting a movable end of the seek motor 8, and reference numeral 25 denotes a spherical aberration correcting motor movable end switch for detecting a movable end of the spherical aberration correcting motor 6.

Operation outlines of respective blocks and relations between blocks will now be described.

Since relations between blocks 1 to 19 and 21 to 23 in FIG. 10 are the same as those in the first embodiment, description of them will be omitted. In FIG. 10, the seek motor movable end switch 24 detects a signal which identifies whether the optical pickup unit 7 has reached a movable end in the inner circumference direction of the disc, and sends the detected signal to the system controller 20.

The spherical aberration correcting motor movable end switch 25 detects a signal which identifies whether the spherical aberration correcting lens 5 has reached either one of movable ends, and sends the detected signal to the system controller 20. The system controller 20 controls the seek motor controller 16 to move the optical pickup unit 7 to a predetermined radial position on the disc on the basis of the signal sent from the seek motor movable end switch 24, when power supply is turned on in the optical disc drive, when a disc is inserted, or when a reproduction error has occurred.

Furthermore, the system controller 20 controls the spherical aberration correcting lens controller 18 to move the spherical aberration correcting lens 5 to a predetermined position on the basis of the signal sent from the spherical aberration correcting motor movable end switch 25, when power supply is turned on in the optical disc drive, when a disc is inserted, or when a reproduction error has occurred. Here, the system controller 20 controls the seek motor controller 16 and the spherical aberration correcting lens controller 18 to make the operation of the seek motor 8 and the operation of the spherical aberration correcting motor 6 parallel and shorten the preparatory operation time of the present optical disk drive.

The reason why the optical pickup unit 7 is moved to a predetermined radial position on the disc when power supply is turned on, when a disc is inserted, or when a reproduction error has occurred as described above is to conduct medium discrimination, adjustment of various signals and servo pull-in by using reflected light from the disc. In the same way, the reason why the spherical aberration correcting lens 5 is moved to a predetermined position when power supply is turned on, when a disc is inserted, or when a reproduction error has occurred is to reduce the influence of the spherical aberrations to the utmost and generate various signals from the disc reflected light.

Figure 11:
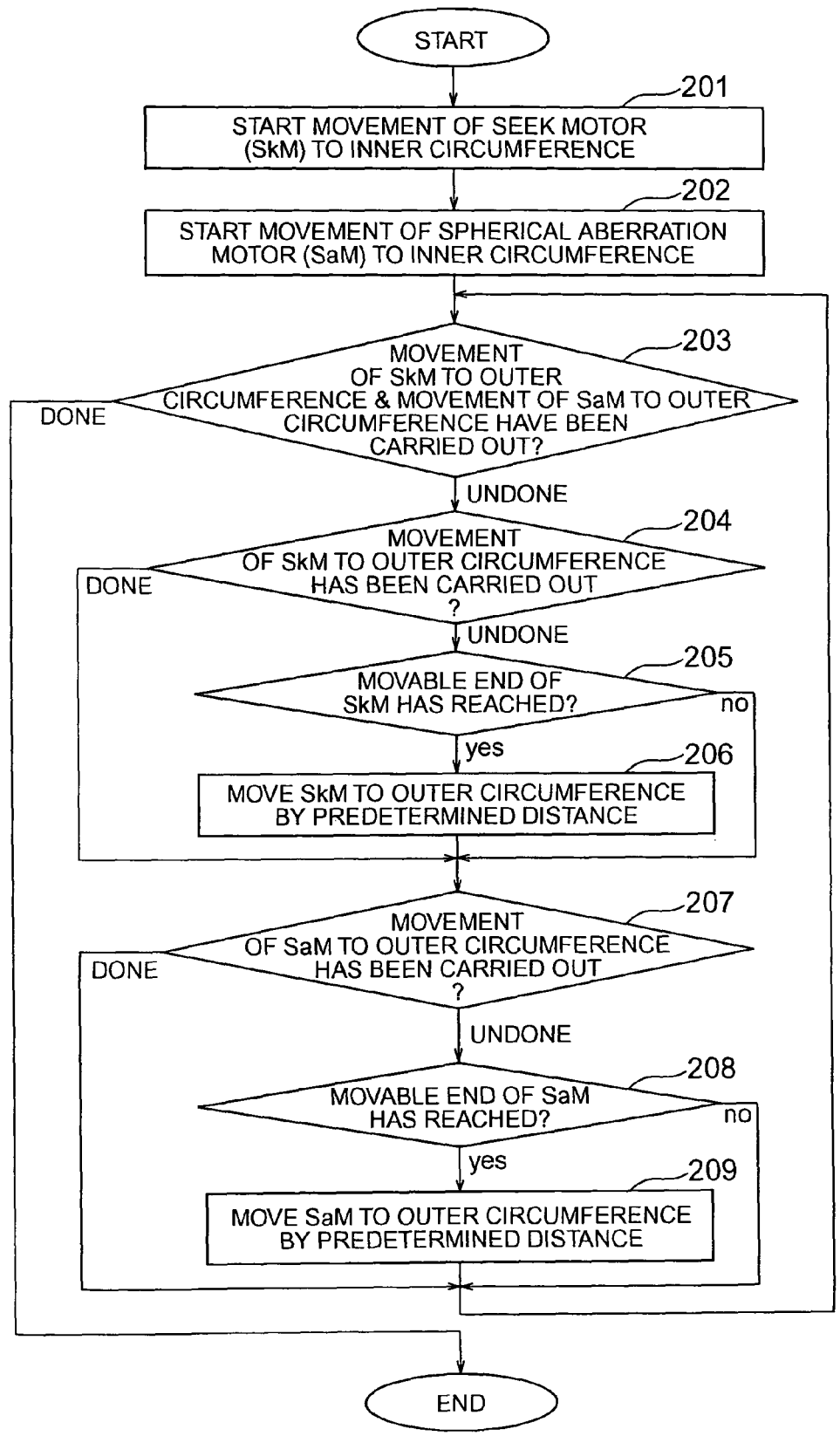
FIG. 11 is a diagram showing an operation in a second embodiment of the present invention.

FIG. 11 shows a flow chart of the above-described operation. The system controller 20 controls the seek motor controller 16 (201) to move the optical pickup unit 7 in the inner circumference direction, and controls the spherical aberration correcting lens controller 18 (202) to move the spherical aberration correcting lens 5 in the inner circumference direction. Here, the inner circumference direction of the spherical aberration correcting lens 5 is supposed to be a direction in which the optical beam is focused. The system controller 20 starts the operation of the seek motor 8 and the operation of the spherical aberration correcting motor 6 successively. Since the inner circumference movement time of the seek motor 8 and the spherical aberration correcting motor 6 is sufficiently longer than the processing time of the system controller 20, however, the seek motor 8 and the spherical aberration correcting motor 6 can operate substantially in parallel.

Thereafter, the system controller 20 monitors signals from the seek motor movable end switch 24 and the spherical aberration correcting motor movable end switch 25 (205) (208). And the system controller 20 controls the seek motor controller 16 or the spherical aberration correcting lens controller 18 to move a motor that has reached the inner circumference to an outer circumference by a predetermined distance (206) (209). If the movements of the both motors to the outer circumference are carried out, the system controller finishes the present processing (203). Steps (204) and (207) are branches of monitoring the movable end switch signals of the seek motor and the spherical aberration correcting motor and determining whether the movement to the outer circumference has been carried out.

In the present embodiment, the spherical aberration correcting lens is used as the spherical aberration correcting element. However, the present invention is not restricted to this. In other words, even in the case where the spherical aberration correction is conducted by using a liquid crystal element, the refractive index transition time of the actual liquid crystal element is in the range of approximately one hundred ms to 1 second. Therefore, a similar effect is obtained by making the transition time parallel to the operation of the seek motor.

Regardless of whether the disc in the present embodiment is a single-layer disc having one reproducing face or recording face or a multilayer disc having a plurality of reproducing faces or recording faces, a similar effect is obtained.

The user'operability can be improved by conducting the operation of the seek motor and the operation of the aberration correcting element in parallel and reducing the preparation operations of the drive or the recovery operations at the time of error occurrence.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc drive, the optical disc drive comprising:
   a focus actuator for moving an objective lens in a rotation axis direction of a disc;
   a tracking actuator for moving the objective lens in a radial direction of the disc;
   aberration correcting means for correcting aberrations;
   feeding means for moving the pickup in the disc radial direction;
   wherein a control operation of said aberration correcting means and a control operation of said feeding means are conducted at least partially in parallel;
   wherein the disc is a multilayer disc;
   wherein the control operation of said aberration correcting means and the control operation of said feeding means are conducted in parallel, in an operation involving an interlayer movement of the pickup;
   wherein the control operation of said feeding means is a coarse seek operation which does not depend upon a tracking error signal; and
   wherein the aberrations at the time of the coarse seek operation are corrected in such way that a value of aberration correction at a target focus jump layer is corrected to a constant value that is preset layer-by-layer.

2. An optical disc drive according to claim 1, wherein the control operation of said aberration correcting means is an operation conducted until said aberration correcting means reaches within a predetermined range from a target position of a movement destination when the pickup conducts the interlayer movement from a position in a layer before the movement.

3. An optical disc drive according to claim 1, wherein
   after tracking control is turned off, the control operation of said aberration correcting means and the control operation of said feeding means are started,
   after the control operation of said aberration correcting means and the control operation of said feed means are finished, the interlayer movement is conducted, and after the interlayer movement is finished, the tracking control is turned on.

4. An optical disc drive according to claim 1, wherein said aberration correcting means comprises an aberration correcting lens and lens drive means for driving the aberration correcting lens.

5. An optical disc drive using a pickup, the optical disc drive comprising:
   a focus actuator for moving an objective lens in a rotation axis direction of an optical disc;
   a tracking actuator for moving the objective lens in a radial direction of a disc;
   aberration correcting means for correcting aberrations;
   feeding means for moving the pickup in the disc radial direction;
   wherein a control operation of said aberration correcting means and a control operation of said feeding means are conducted at least partially in parallel;
   wherein the control operation of said feeding means is an initial positioning operation of the pickup in an initializing operation conducted when a power supply of the optical disc drive is turned on;
   wherein the control operation of said aberration correcting means is an initializing operation of said aberration correcting means in an initializing operation conducted when the power supply of the optical disc drive is turned on;
   wherein the control operation of said feeding means is a coarse seek operation which does not depend upon a tracking error signal; and
   wherein the aberrations at the time of the coarse seek operation are corrected in such way that a value of aberration correction at a target focus jump layer is corrected to a constant value that is preset layer-by-layer.

6. An optical disc drive according to claim 5, wherein the control operation of said aberration correcting means is an operation conducted until said aberration correcting means reaches within a predetermined range from a target position in the initialization operation of said aberration correcting means.

7. An optical disc drive using a pickup, the optical disc drive comprising:
   a focus actuator for moving an objective lens in a rotation axis direction of a disc;
   a tracking actuator for moving the objective lens in a radial direction of the disc;
   aberration correcting means for correcting aberrations;
   feeding means for moving the pickup in the disc radial direction;
   wherein a control operation of said aberration correcting means and a control operation of said feeding means are conducted at least partially in parallel;
   wherein the control operation of said feeding means is an initial positioning operation of the pickup in an initializing operation conducted when the disc is inserted;
   wherein the control operation of said aberration correcting means is an initializing operation of said aberration correcting means in the initializing operation conducted when the disc is inserted;
   wherein the control operation of said feeding means is a coarse seek operation which does not depend upon a tracking error signal; and
   wherein the aberrations at the time of the coarse seek operation are corrected in such way that a value of aberration correction at a target focus jump layer is corrected to a constant value that is preset layer-by-layer.

8. An optical disc drive according to claim 7, wherein the control operation of said aberration correcting means is an operation conducted until said aberration correcting means reaches within a predetermined range from a target position in the initialization operation of said aberration correcting means.

9. An optical disc drive using a pickup, the optical disc drive comprising:
a focus actuator for moving an objective lens in a rotation axis direction of a disc;
a tracking actuator for moving the objective lens in a radial direction of an optical disc;
aberration correcting means for correcting aberrations;
feeding means for moving the pickup in the disc radial direction;
wherein a control operation of said aberration correcting means and a control operation of said feeding means are conducted at least partially in parallel;
wherein the control operation of said feeding means is an initial positioning operation of the pickup in an initializing operation conducted when at least one of a data reproduction error or an address reproduction error has occurred;
wherein the control operation of said aberration correcting means is an initializing operation of setting a control target of said aberration correcting means equal to a target value in a predetermined layer and lasting until said aberration correcting means reaches within a predetermined range from the control target value, in the initializing operation conducted when the at least one of the data reproduction error or the address reproduction error has occurred;
wherein the control operation of said feeding means is a coarse seek operation which does not depend upon a tracking error signal; and
wherein the aberrations at the time of the coarse seek operation are corrected in such way that a value of aberration correction at a target focus jump layer is corrected to a constant value that is preset layer-by-layer.

10. An optical disc drive according to claim 9, wherein the control operation of said aberration correcting means is an operation conducted until said aberration correcting means reaches within a predetermined range from a target position in the initialization operation of said aberration correcting means.

* * * * *